(12) United States Patent
Picone et al.

(10) Patent No.: US 6,250,815 B1
(45) Date of Patent: Jun. 26, 2001

(54) TEMPERATURE COMPENSATING CARRIER BEARING ASSEMBLY

(75) Inventors: Kenneth T. Picone, Pinehurst; Teisuolis C. Mikulskis, Southern Pines; Peggy M. Garrett, Laurinburg, all of NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/339,628

(22) Filed: Jun. 24, 1999

(51) Int. Cl.$^7$ .................................................... F16C 19/52
(52) U.S. Cl. .......................... 384/557; 384/905; 384/906
(58) Field of Search ................................... 384/278, 493, 384/557, 905, 906

(56) References Cited

U.S. PATENT DOCUMENTS

| | | | |
|---|---|---|---|
| 3,561,829 | * 2/1971 | Heldt | 384/557 |
| 5,028,152 | * 7/1991 | Hill et al. | 384/557 |
| 5,073,039 | * 12/1991 | Shervington | 384/278 |
| 5,598,747 | * 2/1997 | Schetter et al. | 384/557 X |

* cited by examiner

Primary Examiner—Thomas R. Hannon
(74) Attorney, Agent, or Firm—Carlson, Gaskey & Olds

(57) ABSTRACT

A vehicle transmission is provided having a housing that includes a support with an opening. The transmission also has a shaft with an axis of rotation and an end portion disposed within the support opening. A floating bearing assembly is arranged between the housing and the end portion so that the bearing assembly supports the end portion within the support opening thereby permitting the shaft to rotate about it axis within the support opening. The bearing assembly is movable along the axis of rotation relative to the housing to permit the shaft to move along the axis of rotation. An expansion member is arranged between the end portion and the housing to expand and contract with changing temperatures and maintain a desired end play tolerance between the end portion and the housing.

10 Claims, 2 Drawing Sheets

TEMPERATURE COMPENSATING CARRIER BEARING ASSEMBLY

BACKGROUND OF THE INVENTION

This invention relates to an improved bearing assembly for transmission shafts. Specifically, the invention relates to an improved bearing assembly that compensates for the increase in shaft end play caused by rising temperature during operation of the transmission.

Prior art transmissions typically have main and auxiliary countershafts coupled to transmission input and output shafts by ears to achieve a desired multiplication of torque. The countershafts are supported within a transmission housing by bearing assemblies. The bearing assemblies are arranged between the housing and the ends of the shafts to minimize the friction between the housing and shafts as the shafts rotate about their axes.

Under certain operating conditions the shafts may have some end play. That is, the shafts have clearance within bearing assemblies that permits slight movement along their axes relative to the housing. The bearing assemblies are designed primarily to withstand large radial loads but only minimal axial loads. As a result excessive end play, which permits higher axial loads, may increase bearing wear and noise. In an effort to minimize end play, the bearings are typically axially located and shimmed during installation to achieve a desired axial clearance or tolerance.

Typically, the bearing assemblies are press fit, or permanently affixed, into housing openings and onto the ends of the shafts. As a result, the desired axial tolerance cannot be adjusted as the amount of end play changes during the course of transmission operation. Specifically, as the transmission temperature changes, the transmission components expand and contract as the temperature rises and falls, respectively. This situation is complicated by the fact that the transmission components are constructed from different materials having different coefficients of thermal expansion. For example, the housing is constructed from aluminum, which has a high coefficient of expansion, while the bearings and shafts are constructed from steel, which have a low coefficient of thermal expansion. Since, at the same temperature, the housing expands more than the bearings and shafts, end play may increase as the temperature rises.

SUMMARY OF THE INVENTION AND ADVANTAGES

The present invention provides a vehicle transmission having a housing that includes a support with an opening. The transmission also has a shaft with an axis of rotation and an end portion disposed within the support opening. A floating bearing assembly is arranged between the housing and the end portion so that the bearing assembly supports the end portion within the support opening thereby permitting the shaft to rotate about it axis within the support opening. The bearing assembly is movable along the axis of rotation relative to the housing to permit the shaft to move along the axis of rotation. An expansion member is arranged between the end portion and the housing to expand and contract with changing temperatures and maintain a desired end play tolerance between the end portion and the housing.

The expansion member has a coefficient of thermal expansion that allows it to adjust for the expansion and contraction of transmission components along the axis. Said another way, the expansion member grows to a size that fills the gap created by the expansion of the transmission components along the axis.

Accordingly, the present invention sufficiently maintains the desired axial tolerance during changes in transmission temperature and prevents increases in end play.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
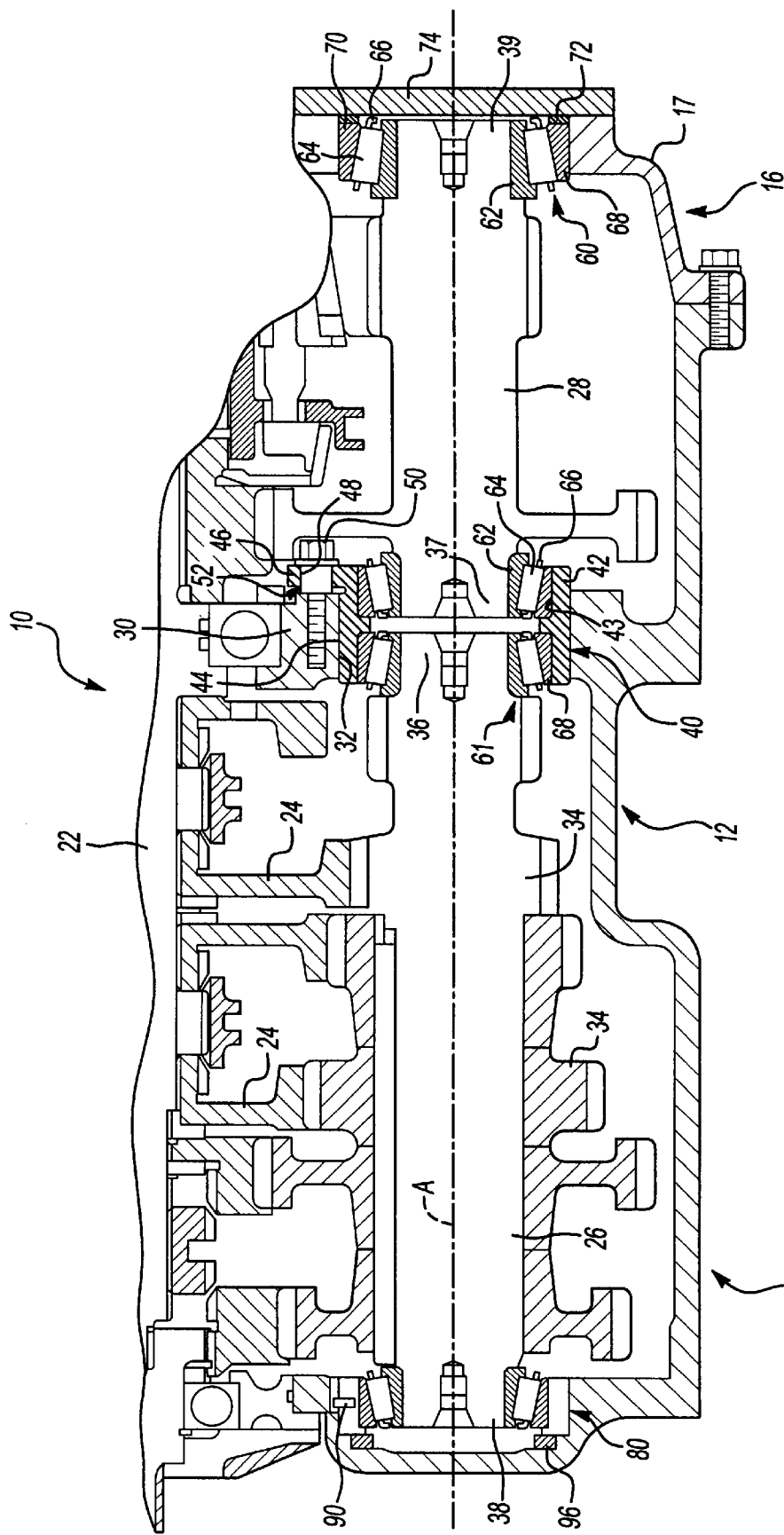
FIG. 1 is a cross-sectional view of a partially broken away view of a manual transmission.

A transmission for use in a vehicle is generally shown at 10 in FIG. 1. The transmission 10 has an aluminum housing 12 that includes a main gear box 14 at the front of the transmission and a auxiliary gear box 16 at the rear of the transmission. The auxiliary gear box 16 has a removable portion 17 to facilitate the installation of the transmission components into the housing 12. The removable portion 17 is then fastened to the auxiliary box 16 to enclose and seal the transmission components from the outside environment.

The transmission 10 further comprises a main shaft 22, partially shown in FIG. 1. which carries a plurality of gears 24. First 26 and second 28 steel countershafts are coaxial along an axis A, which is parallel to the main shaft 22. The first 26 and second 28 countershafts, or main and auxiliary countershafts respectively, mount a plurality of gears 34 that engage the plurality of gears 24 on the main shaft 22. The main 26 and auxiliary 28 countershafts have end portions 38,39 and opposite end portions 36,37 that oppose the end portions 38,39.

The opposite end portions 36,37 and the end portions 38,39 are supported in the housing 12 by bearing assemblies 40,60,80. The bearing assembly 80 supports the end portion 38 of the main contershaft 27 and has typically been press fit into the housing 12. The bearing assembly 40 supports the opposite end portions 36,37 and has also typically been press fit into the housing 12. The bearing assembly 60 supports the end portion 39 of the auxiliary countershaft and is typically shimmed during installation of the countershafts 26,28 to achieve a desired axial tolerance.

The floating bearing assembly 40 may be used as an alternative to prior art press fit bearing arrangements to support the opposite end portions 36,37 within the opening 32, as disclosed in U.S. application Ser. No. 09/264252, filed Mar. 8, 1999. The main gear box 14 of the housing 12 has a center support 30, or midwall with an opening 32. The opposite end portions 36,37 are disposed within and supported in the opening 32. The center bearing assembly 40 fits closely within the opening 32. That is, the bearing assembly 40 has a tight slip fit within the opening 32. Floating bearing assembly 40 is movable along axis A relative to center support 30 for permitting the auxiliary countershaft 28 to be adjusted along axis A relative to the main countershaft 26 upon assembly.

The bearing assembly 40 includes a carrier 42 disposed within the opening 32 for sliding therein along axis A. The carrier 42 has an outer surface 44 that acts as a sleeve bearing with the opening 32. The carrier 42 includes a flange 46 that extends radially from the outer surface 44 and generally parallel with center support 30. The flange 46 has an aperture 48 with a fastener 50 disposed within the aperture 48 and connected to the center support 30 thereby anchoring the carrier 42 to the center support 30. The fastener 50 is parallel with axis A thereby permitting the carrier 42 to move along axis A while preventing the carrier from rotating about axis A. There is a gap 52 between the flange 46 and the center support 30 so that the carrier 42 may move relative to the center support 30 when the countershafts 26,28 are shimmed to the desired tolerance.

Rollers bearings 61 are used to support the opposite end portions 36,37 in the carrier 42. Each roller bearing 61 includes a cone 62 pressed onto the opposite end portions 36, 37, and a set of rollers 64 radially located about the cone 62 and retained by a cage 66. Cups 68 are pressed into an inside opening 43 in the carrier 42.

Although a floating bearing assembly 40 is shown supporting opposite end portions 36,37, it will be appreciated from the description below that a typical prior art fixed bearing assembly may also be used concurrently with the present invention.

The roller bearing assembly 60 is arranged between the end portion 39 of the auxiliary countershaft 28 and the housing 12. The bearing assembly 60 is installed after the countershafts 26,28 and other bearing assemblies 40,80 have been installed, and is used to obtain a desired axial tolerance. Like roller bearing assembly 61, the assembly 60 includes a cone 62 pressed onto the end portion 39, and a set of rollers 64 radially located about the cone 62 and retained by a cage 66. Typically, a preload is applied to the countershafts, as known in the art, to obtain a desired axial tolerance in the assembly, and a cup 68 is pressed into an opening 70 in the housing 12. A shim 72 is installed in abutting relationship to the cup 44 to maintain the desired tolerance of the countershafts 26,28 along axis A during transmission operation. An end cap 74 is affixed to the removable portion 17 adjacent to the shim 72 thereby preventing the countershafts 26,28 from shifting along axis A.

In the prior art, after the countershafts 26,28 and bearing assemblies 40,60,80 have been installed the axial tolerance cannot be altered. Thus, as the transmission components expand under increasing temperatures the axial tolerance grows thereby permitting increased end play. By using the floating bearing assembly 40, the end play may be further magnified because the countershafts are permitted to move along the entire length of axis A in the housing 12, as opposed to being limited to their respective gear box if a fixed bearing assembly had been used. Regardless, end play causes several undesirable effects, as mentioned above.

Figure 2:
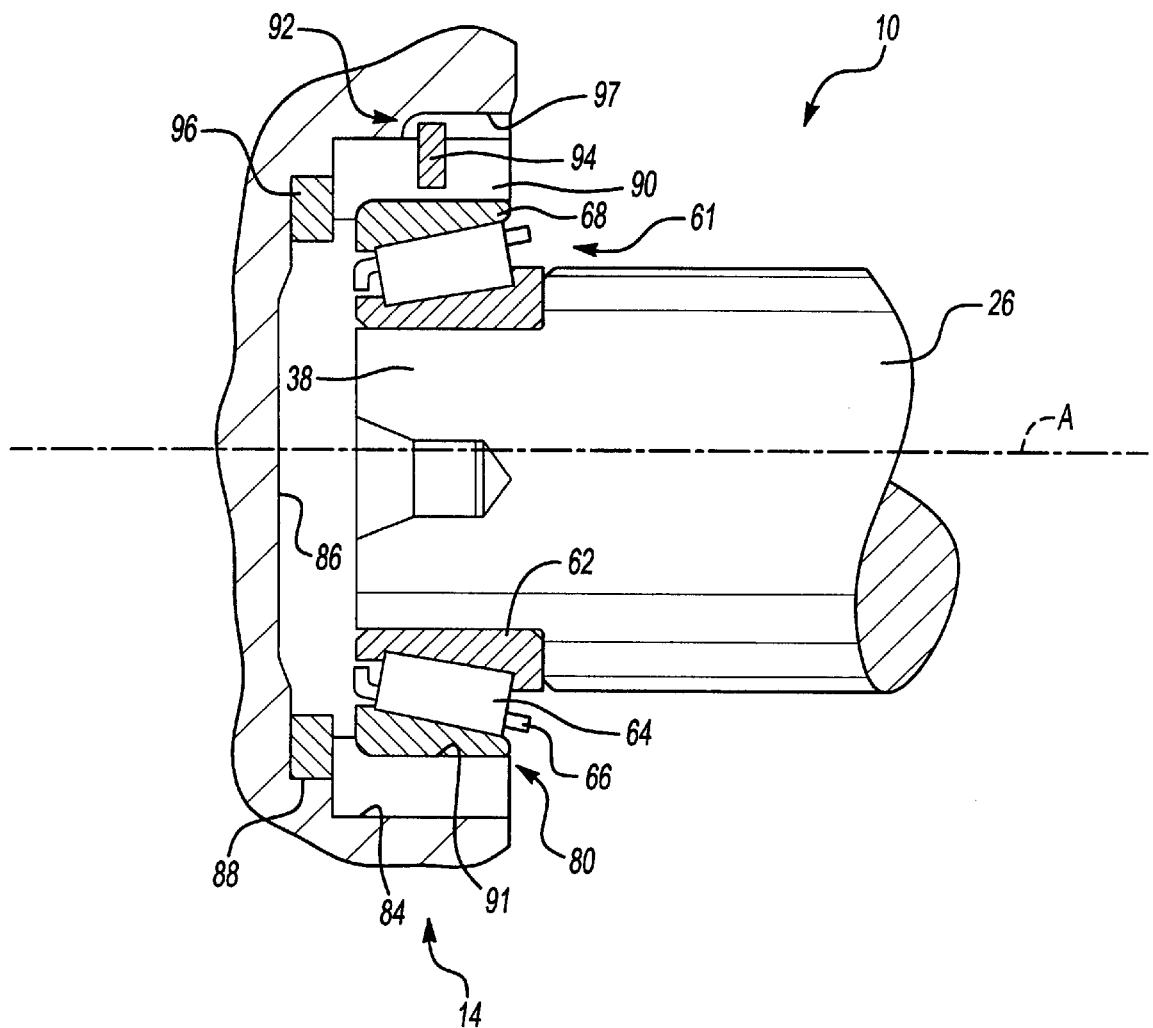
FIG. 2 is an enlarged view of the present invention as shown in FIG. 1.

To minimize the effects of temperature as it relates to end play, the present invention provides a bearing assembly 80 that adjusts along axis A as the temperature changes to sufficiently maintain the desired tolerance. Referring now to FIG. 2, the main gear box 14 has an opening 84 defined by an end wall 86 and a cylindrical surface 88 surrounding the end wall 86. The cylindrical surface 88 may be stepped, as shown, or may be a continuous surface.

The end portion 38 is supported within the opening 84 by the floating bearing assembly 80. The bearing assembly 80 is movable along axis A relative to the end wall 86 of the housing 12 for permitting movement by the main countershaft 26 along axis A. If a floating center bearing assembly is used, like the one shown in FIG. 1, then the auxiliary countershaft 28 will also be permitted to move along axis A as bearing assembly 80 moves.

Similar to the floating bearing assembly 40, the bearing assembly 80 includes a carrier 90 disposed within the opening 84 in a slip fit relationship for sliding within the opening 84 along axis A. A roller bearing assembly 61 is interposed between the carrier 90 and the end portion 38 for reducing the friction between the end portion 38 and the carrier 90 when the main countershaft 26 rotates about the axis A. The roller bearing 61 includes a cone 62 pressed onto the end portions 38 and a set of rollers 64 radially located about the cone 62 and retained by a cage 66. A cup 68 is pressed into an inside opening 91 in the carrier 90.

The bearing assembly 80 is prevented from rotating within opening 84 while still being permitted to move along axis A by an interlock 92. The interlock 92 coacts with the carrier 90 and the housing 12 to limit the carrier's movement to the axial direction. To accomplish this end, the interlock 92 includes a pin 94 extending radially from the carrier 90 and a slot 97 in the cylindrical surface 88 that slidingly receives the pin 94.

An expansion member 96 is arranged between the end portion 38 and the housing 12, or more specifically, between the end wall 86 and carrier 90. The expansion member 96 expands and contracts with changing temperatures to maintain the desired end play tolerance that is obtained when the bearing assemblies 40,60,80 and countershafts 26,28 are initially installed in the housing 12. Preferably, the expansion member 96 is a rind that is arranged adjacent to the cylindrical surface 88 and interposed between the end wall 86 and the carrier 90. Member 96 is preferably sized to provide a bias force against carrier 90, even at low temperatures.

In operation, as the temperature rises the transmission components become larger. This causes the clearance along axis A to increase which permits increased end play, or axial movement, by the countershafts. But, as the temperature rises the size of the expansion member 96 also increases and biases the bearing assembly 80 along axis A towards the other end of the transmission. In this manner, the expansion member reduces the clearance and end play along axis A that would otherwise result.

The material for the expansion member 96 preferably has a coefficient of thermal expansion that allows it to adjust based upon the coefficients of thermal expansion of the countershafts 26,28, bearing assemblies 40,60,80, housing 12, and any other transmission components whose expansion and contraction might affect the amount of end play. That is, the desired material for the expansion member 96 may be selected by determining the amount that these transmission components will expand at a given temperature. One material that may be used is a plastic which Applicant believes is available through Timken Co. and marketed under the trade name VITON, which is a registered trademark of DuPont Dow Elastomers. However, any material having, a suitable coefficient of thermal expansion may be used.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A transmission for use in a vehicle comprising:

a housing having a support with an opening;

a shaft having an axis of rotation and an end portion disposed within said suppport opening;

a floating bearing assembly supporting said end portion within said support opening wherein said bearing assembly is interposed between said housing and said end portion, said bearing assembly being movable along said axis of rotation relative to said housing for permitting said shaft to move along said axis of rotation;

an expansion member interposed between said end portion and said housing for expanding and contracting with changing temperatures to maintain a desired end play tolerance between said end portion and said housing;

wherein said opening is defined by an end wall and a cylindrical surface surrounding said end wall, said expansion member being a ring adjacent to said cylindrical surface and interposed between said end wall and said bearing assembly; and wherein said housing further includes a center support with an opening, said shaft further includes an opposite end portion opposing said end portion, said opposite end portion being disposed within said center support opening, and wherein a center bearing assembly supports said opposite end portion within said center support opening wherein said center bearing assembly is interposed between said housing and said opposite end portion.

2. The transmission as set forth in claim 1 wherein said center bearing assembly includes fixed bearings.

3. The transmission as set forth in claim 1 wherein said center bearing assembly includes floating bearings.

4. A transmission for use in a vehicle comprising:

a housing having a support with an opening;

a shaft having an axis of rotation and an end portion disposed within said support opening;

a floating bearing assembly supporting said end portion within said support opening wherein said bearing assembly is interposed between said housing and said end portion, said bearing assembly being movable along said axis of rotation relative to said housing for permitting said shaft to move along said axis of rotation;

an expansion member interposed between said end portion and said housing for expanding and contracting with changing temperatures to maintain a desired end play tolerance between said end portion and said housing;

wherein said opening is defined by an end wall and a cylindrical surface surrounding said end wall, said expansion member being a ring adjacent to said cylindrical surface and interposed between said end wall and said bearing assembly; and wherein said bearing assembly includes a carrier disposed within said opening for sliding therein along said axis of rotation, and bearings interposed between said carrier and said end portion for reducing the friction between said end portion and said carrier when said shaft rotates about said axis of rotation.

5. The transmission as set forth in claim 4 further including an interlock coacting with said carrier and said housing for permitting said carrier to move along said axis or rotation while preventing said carrier from rotating about said axis of rotation.

6. The transmission as set forth in claim 5 wherein said interlock includes a pin extending radially from said carrier, and a slot in said cylindrical surface that slidingly receives said pin.

7. The transmission as set forth in claim 5 wherein said bearings are roller bearings.

8. The transmission as set forth in claim 7 wherein said roller bearings further include a cup pressed into said carrier, a cone pressed onto said end portion, and rollers interposed between said cup and cones.

9. A transmission for use in a vehicle comprising:

a housing having a support with an opening;

a shaft having an axis of rotation and an end portion disposed within said support opening;

a floating bearing assembly supporting said end portion within said support opening wherein said bearing assembly is interposed between said housing and said end portion, said bearing assembly being movable along said axis of rotation relative to said housing for permitting said shaft to move along said axis of rotation;

an expansion member interposed between said end portion and said housing for expanding and contracting with changing temperatures to maintain a desired end play tolerance between said end portion and said housing; and wherein said housing further includes a center support with an opening, said shaft further includes an opposite end portion opposing said end portion, said opposite end portion being disposed within said center support opening, and wherein a center bearing assembly supports said opposite end portion within said center support opening wherein said center bearing assembly is interposed between said housing and said opposite end portion.

10. A transmission for use in a vehicle comprising:

a housing having a support with an opening;

a shaft having an axis of rotation and an end portion disposed within said support opening;

a floating bearing assembly supporting said end portion within said support opening wherein said bearing assembly is interposed between said housing and said end portion, said bearing assembly being movable along said axis of rotation relative to said housing for permitting said shaft to move along said axis of rotation;

an expansion member interposed between said end portion and said housing for expanding and contracting with changing temperatures to maintain a desired end play tolerance between said end portion and said housing; and wherein said bearing assembly includes a carrier disposed within said opening for sliding therein along said axis of rotation, and bearings interposed between said carrier and said end portion for reducing the friction between said end portion and said carrier when said shaft rotates about said axis of rotation.

* * * * *